United States Patent [19]

de Tuesta

[11] Patent Number: 4,867,294
[45] Date of Patent: Sep. 19, 1989

[54] ACCUMULATOR PISTON FOR AUTOMOTIVE TRANSMISSION

[76] Inventor: Diaz de Tuesta, 12777 Norton, Chino, Calif. 91710

[21] Appl. No.: 200,441

[22] Filed: May 31, 1988

[51] Int. Cl.⁴ .............................................. F16D 25/12
[52] U.S. Cl. .................................... 192/109 F; 138/31; 277/236
[58] Field of Search ....................... 192/109 F; 92/246; 138/31; 277/236

[56] References Cited

U.S. PATENT DOCUMENTS 1,773,372  8/1930  Nelson ................................... 92/236
3,099,172  7/1963  Jania et al. ........................... 192/85 V

FOREIGN PATENT DOCUMENTS 266343  8/1927  United Kingdom .................. 92/236

OTHER PUBLICATIONS

"Automatic Transmissions", Frank Thiessen and Davis Dales, Reston Publishing Co., Copyright 1984, pp. 8, 99, 100 and 236.
"1978 Arrow Colt Service Manual", Chrysler Corporation, pp. 9-35, 9-119.

Primary Examiner—Leslie A. Braun
Assistant Examiner—Andrea Pitts
Attorney, Agent, or Firm—Boniard I. Brown

[57] ABSTRACT

In an automotive transmission, an improved accumulator of the piston-cylinder type. The piston and cylinder are formed of the same material, e.g., aluminum, whereby the two components thermally expand at the same rate, thereby providing leak-free operation over wide operating temperature ranges. Spring steel piston rings are used in pairs to provide redundant seals, thereby giving an added measure of seal assurance.

2 Claims, 1 Drawing Sheet

ACCUMULATOR PISTON FOR AUTOMOTIVE TRANSMISSION

BACKGROUND OF THE INVENTION

This invention relates to an accumulator usable in an automotive transmission to absorb hydraulic forces associated with clutch engagement actions.

An existing automatic overdrive transmission used in Ford automobiles has a liquid accumulator that comprises a stepped cavity machined into the transmission housing; a stepped piston is slidably disposed within the cavity for linear movement in response to liquid forces introduced into opposite ends of the cavity.

A variable throttle pressure is applied to the large bore end of the cavity and also to a liquid clutch. As the pressurized liquid pressures the clutch plates toward the clutch-engaged drive mode it also exerts a liquid force on the piston in the accumulator; the piston is moved to enlarge the liquid volume in the large bore end of the cavity, thereby absorbing some of the shock forces that would otherwise produce a jerky (non-smooth) vehicle speed change.

In the existing transmission the transmission housing is formed of aluminum, whereas the stepped piston is formed of a thermoplastic material. The piston has elastomeric O-ring seals slidably engaged with the aluminum cavity surfaces.

Some leakage problems have been encountered with the existing arrangement. The aluminum housing thermally expands at a higher rate than the plastic piston; as the temperature rises within the accumulator cavity the clearances between the piston side surfaces and cavity side surface increase, thereby tending to permit leakage of the pressurized liquids across the O-ring seals.

The O-ring seals compensate to some extent for the increased clearances between the piston and cavity side surfaces. However, in some cases the O-ring seals have not been fully effective. Also, the high temperatures over time tend to degrade the elastomeric seals, i.e., by destroying the plasticizers. The O-ring seals also tend to become pinched in the piston-cavity crack interfaces and to be abraded by contact with the relatively hard aluminum surfaces. Service life of the O-ring seals is generally much shorter than the life of the transmission in which they are installed.

SUMMARY OF THE INVENTION

My invention contemplates a stepped piston that is of the same material as the transmission housing, e.g., an aluminum piston and aluminum transmission housing, whereby the piston and housing thermally expand at approximately the same rate. The aim is to eliminate the excessively large clearances that have heretofore produced undesired leakage conditions.

In my proposed arrangement two cast iron or spring steel piston rings are used in lieu of each elastomeric O-ring seal, thereby providing an advantageous seal redundancy that is lacking in the existing arrangement.

The proposed piston rings exhibit a much improved wear life compared to the elastomeric O-rings. Also, the spring nature of the steel rings tends to compensate (overcome) the effects of seal wear.

A general object of my invention is to provide a piston-cylinder type accumulator having a leak-free operational mode, under high temperature operating conditions, and over relatively long periods of service.

Another object is to provide an accumulator design that can be used in or with existing automotive transmissions. The sole change in the accumulator resides in the piston; the accumulator cavity (bore) remains unchanged. The new piston can be manufactured as a service part for use as replacement for worn plastic pistons in pre-existing automotive transmissions.

DESCRIPTION OF A PREFERRED EMBODIMENT OF THE INVENTION

Figure 1:
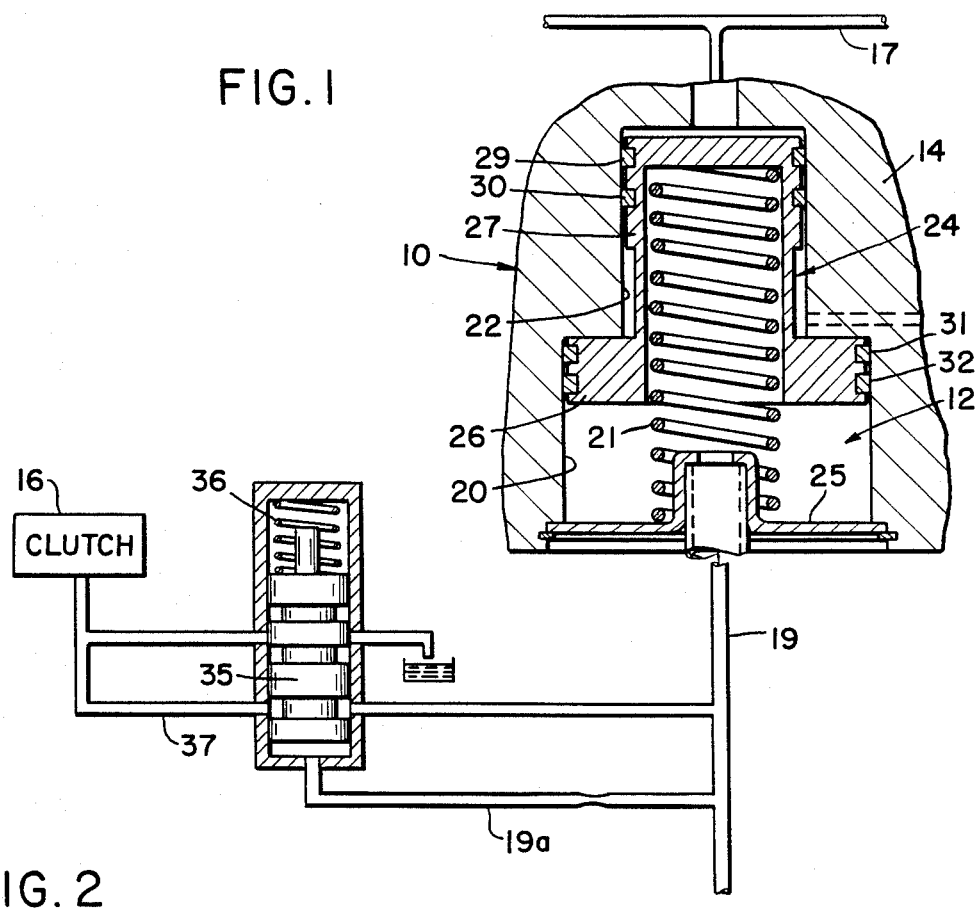
FIG. 1 a sectional view taken through an accumulator embodying my invention. Associated hardware is shown schematically.

FIG. 1 shows an accumulator 10 embodying my invention. The accumulator comprises a cylindrical cavity (bore) 12 machined into an automotive transmission housing 14. The operating drive components are not shown in FIG. 1; in practice, such components can correspond to the componentry shown in U.S. Pat. No. 3,099,172 issued to Z. Jania, et al. However, the referred transmission structure is a commercially produced automatic transmission used in Ford, Lincoln and Mercury automobiles from 1980 to date. Such a transmission includes a hydrodynamic torque converter section connected to planetary gearing to provide four forward gear ratios and one reverse gear ratio; one of the forward gear ratios is overdrive.

The preferred transmission includes a number of fluid-operated clutches acting as drive components or brake mechanisms for planetary gear elements. Accumulators are associated with the clutches to absorb shock forces associated with clutch-engagement action. Attached FIG. 1 shows one such accumulator 10 modified according to my invention; the associated clutch is designated by number 16.

The transmission includes liquid pump elements and pressure regulator devices that provide a regulated line pressure to hydraulic components in the transmission. Additionally, a control valve system is provided to produce a variable pressure related to driver-generated power demand, e.g., for vehicle acceleration or uphill speed control; such variable pressure is referenced in above-mentioned U.S. Pat. No. 3,099,172 as throttle valve pressure. In attached Figure regulated line pressure is applied through line 17 to the upper end of accumulator cavity 12; throttle valve pressure is applied through line 19 to the lower end of cavity 12.

Referring in more detail to FIG. 1, cavity 12 comprises a large diameter cylindrical bore 20 and a small diameter cylindrical bore 22. Line 17 delivers regulated line pressure to bore 22; line 19 delivers variable throttle valve pressure to bore 20.

Disposed within cavity 12 is a stepped piston 24, that comprises a large diameter piston section 26 and small diameter piston section 27. The piston is shorter than cavity 12 in the axial dimension, such that the piston can slide up and down, according to variations in throttle valve pressure (line 19); the piston is shown in its "up" position. The piston is preferably as elongated as practicable in relation to cavity 12 in order to provide a quick gear-shifting action because of overlap with respect to the point of shift, as will be understood from the geometry of the components.

The accumulator operates in known fashion. Throttle valve pressure in line 19 is at all times lower than line 17 regulated pressure. However, because piston section 26 has approximately three times the end area as piston section 27 the piston can at times be moved up by the line 19 pressure. Spring 21 augments the action of the pressure in line 19.

When the pressure in line 19 is below a certain value piston 24 will be in its "down" position engaged with cavity closure wall 25. Line 19 pressure is applied through line 19a to an end face of a flow control piston 35. A calibrated spring 36 biases the piston down to a position closing clutch fluid supply line 37. FIG. 1 is a schematic illustration of the clutch fluid supply control system; the actual system is somewhat more complex than as shown here.

When the pressure in line 19 is relatively high (or in a predetermined range) the pressure in line 19a moves valve 35 to its illustrated position wherein pressurized liquid is supplied to clutch 16 via line 37. The pressure below piston section 26 rises abruptly to force the stepped piston up toward its illustrated position. The associated liquid flow into bore 20 relieves the liquid-generated forces applied against the plates in clutch 16, thereby promoting a relatively smooth shifting action, with minimal disturbance to vehicle speed. The action of the accumulator is conventional.

My invention relates in part to the materials used to construct the accumulator. In practice of my invention the piston and transmission housing 14 are formed of the same material, e.g., aluminum, whereby high temperatures in cavity 12 (heated oil) cause the cavity and piston to expand at approximately the same rate; the clearances between the piston side surface and cavity side surfaces are maintained relatively constant. The piston can be manufactured to have a relatively close sliding fit in the cavity, e.g., a radial clearance on the order of 0.001 inch.

Figure 2:
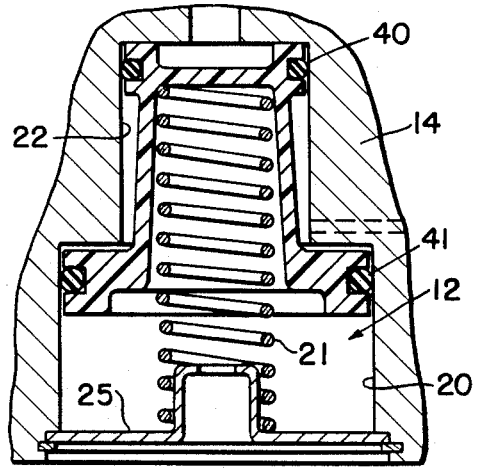
FIG. 2 is a view similar to FIG. 1, but showing a prior art accumulator design.

FIG. 2 illustrates a prior art accumulator which my invention is designed to supplant. The accumulator cavity 12 is the same size and configuration as in FIG. 1; also the housing material is the same, e.g., aluminum. The stepped piston is formed of a thermoplastic material that has a materially lower coefficient of thermal expansion than the aluminum housing. Operations at high temperatures, e.g., above one hundred fifty degrees, can cause the clearances between the piston side surfaces and cavity side surfaces to significantly increase, thereby raising the possibility of fluid leakage across the piston seals (O-rings). My invention is designed to avoid such leakage.

In my invention, as shown in FIG. 1, each piston section 26 or 27 has two axially spaced circumferential grooves in its side surface. A C-shaped metal ring 29, 30, 31, or 32 of cast iron or spring steel is disposed in each groove. Each metal ring is constructionally similar to piston rings used in internal combustion engines for sealing the engine combustion chambers. Each C-shaped ring has a minimum gap between its opposite ends measuring only about 0.001 inch. The two rings on each piston section are arranged so that the gaps are diametrically spaced from one another, e.g., if the end gap for ring 29 is to the left in FIG. 1 then the end gap for ring 30 will be located to the right. Such gap locations enhance seal action.

Each piston ring has a spring character, whereby the outer side face of the ring has pressure contact with the associated cavity surface. The outer side faces of rings 29 and 32 extend parallel to the piston axis for substantial facial engagement with the cavity side surfaces.

It will be seen that the axial dimension of each steel ring 29, 30, 31 or 32 is materially less than the axial dimension of the corresponding O-ring 40 or 41 in FIG. 2. The steel ring cross section provides a precision wiper type contact even though each ring has a relatively small axial dimension. It thus becomes possible to provide two piston rings in the axial space that was heretofore used to accommodate one O-ring. The resultant seal redundancy greatly improves the seal action and seal service life.

The spring steel piston rings are also advantageous over O-rings in that the built-in spring action maintains a good seal even after expansion of the cavity surface due to operation at elevated temperatures; operation of the O-rings at elevated temperatures suffers somewhat, especially when the piston is formed of a plastic material that is unable to expand so as to keep pace with the aluminum cavity surface. The seal problem is most acute at the upper end of the piston which is subjected to the highest pressures (line 17).

It is believed that my aluminum piston may have advantages over the plastic piston as regards wear and uniformity. The aluminum piston surface will have the same hardness as the aluminum cavity surface, such that neither surface should experience much wear. Also, the aluminum piston is a machined component that can be manufactured within relatively small tolerances, e.g., less than 0.001 inch radial dimension. The plastic piston is a molded component that cannot easily be formed within precise tolerance limits. Wear of the plastic piston may be a problem. Relatively large land areas on the plastic piston side surfaces are required to minimize wear. The aluminum piston requires only small land areas (when used in an aluminum housing).

My invention contemplates an improved accumulator piston having leak-free action, even at high operating temperatures or after prolonged service.

Figure 3:
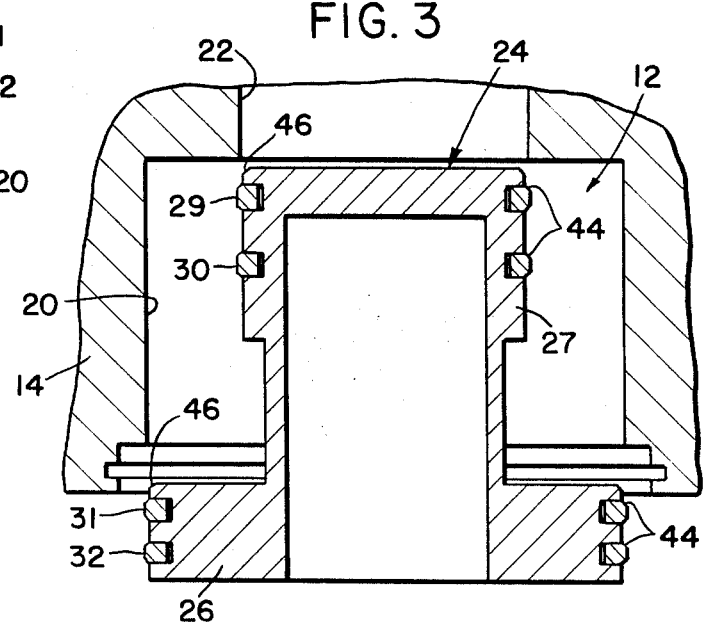
FIG. 3 is a fragmentary sectional view of the FIG. 1 accumulator showing how the piston is installed into the cavity.

It will be seen from FIG. 1 that small diameter cylindrical bore 22 is a blind hole in housing 14. This means that piston 24 must be installed through the large diameter bore 20. The axial dimensions of piston sections 27 and 26 are such that a piston ring clamping tool cannot be applied to rings 29 and 30 while piston section 27 is being inserted into bore 20; FIG. 3 shows that piston sections 26 and 27 enter their respective bores 20 and 22 substantially simultaneously so that no free space is available for a clamping tool around rings 29 and 30.

The various rings 29, 30, 31 and 32 are preferably formed with bevelled corners 44. Also, the leading (upper) corner areas of piston sections 26 and 27 are bevelled, as at 46.

The bevelled surfaces act as cam surfaces against the surfaces of bores 22 and 20, whereby rings 29, 30, 31 and 32 are automatically contracted into the associated piston groves during the process of installing the piston into cavity 12. The piston rings enjoy pressure contact against the associated bore surfaces.

The inventor claims:

1. In an automotive transmission comprising a metallic housing and a hydraulically-operated clutch therein, the improvement comprising:

an accumulator hydraulically connected to said clutch for absorbing hydraulic force associated with clutch engagement action, said accumulator comprising a cylindrical cavity extending into the metallic housing, said cavity having a large diameter bore and a small diameter bore, a stepped piston slidably disposed within said cavity, the piston comprising a large diameter section within the large diameter bore and a small diameter section within the small diameter bore, said piston being formed of a metallic material having substantially the same coefficient of thermal expansion as the transmission housing, the piston being installable into the cavity so that the small diameter section of the piston is first moved through the large diameter bore and then into the small diameter bore, first and second axially spaced split metallic piston rings carried by the large diameter piston section in slidable pressure engagement with the associated bore surface, said first and second rings having bevelled leading edges which act as cam surfaces against the surface of the small diameter bore during the installation of the piston into the cavity, whereby said first and second piston rings are automatically contracted into the associated piston grooves and into pressure contact with the associated bore surfaces, said bevelled leading edges on the first and second rings being angled and sized so that during installation movement of the piston the associated rings are contracted to fit into the small diameter bore without applying a clamping tool to the rings, and third and fourth axially spaced split metallic piston rings carried by the small diameter piston section in slidable pressure engagement with the associated surface.

2. The transmission improvement according to claim 1, wherein:
the housing and piston are formed of aluminum, and the piston rings are formed of spring steel.

* * * * *